US008150257B1

(12) United States Patent
Choudhury et al.

(10) Patent No.: US 8,150,257 B1
(45) Date of Patent: Apr. 3, 2012

(54) SHARED MESH RESTORATION WITH PRE-CONFIGURED STANDBY LIGHTPATHS

(75) Inventors: Gagan L. Choudhury, Marlboro, NJ (US); Angela Lan Chiu, Holmdel, NJ (US); Robert Duncan Doverspike, Tinton Falls, NJ (US); Guangzhi Li, Madison, NJ (US); John L. Strand, Holmdel, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 937 days.

(21) Appl. No.: 12/214,591

(22) Filed: Jun. 20, 2008

Related U.S. Application Data

(60) Provisional application No. 60/936,765, filed on Jun. 21, 2007.

(51) Int. Cl.
*G02F 1/00* (2006.01)
(52) U.S. Cl. .......... 398/5; 398/6; 398/2; 398/3; 398/175
(58) Field of Classification Search .................. 398/1, 2, 398/5, 6, 3, 175
See application file for complete search history.

(56) References Cited

U.S. PATENT DOCUMENTS

| | | | |
|---|---|---|---|
| 7,113,698 B1* | 9/2006 | Ryhorchuk et al. | 398/10 |
| 7,224,897 B1* | 5/2007 | Slezak et al. | 398/5 |
| 7,526,198 B1* | 4/2009 | Chiu et al. | 398/19 |
| 7,599,621 B2* | 10/2009 | Guy et al. | 398/57 |
| 7,805,075 B2* | 9/2010 | Chiu et al. | 398/19 |
| 7,958,072 B2* | 6/2011 | Tofts et al. | 706/45 |
| 7,986,881 B2* | 7/2011 | Weston-Dawkes et al. | 398/83 |
| 2002/0097671 A1* | 7/2002 | Doverspike et al. | 370/216 |
| 2004/0190910 A1* | 9/2004 | Akiyama et al. | 398/186 |
| 2004/0220886 A1* | 11/2004 | Kumaran et al. | 705/400 |
| 2005/0031340 A1* | 2/2005 | Vigoureux et al. | 398/5 |
| 2010/0067899 A1* | 3/2010 | Li et al. | 398/1 |
| 2011/0229122 A1* | 9/2011 | Castoldi et al. | 398/2 |

OTHER PUBLICATIONS

Angela L. Chiu, et al.; "Economic Benefits of Transparent OXC Networks As Compared to Long Systems With OADM's"; OFC, Atlanta, Mar. 2003.
John Strand, et al.; "Realizing the Advantages of Optical Reconfigurability and Restoration With Integrated Optical Cross-Connects"; Journal of Lightwave Technology, vol. 21, No. 11, Nov. 2003.
John Wei, et al.; "Convergence Through Packet-Aware Transport"; The Journal of Optical Networking Special Issue on Convergence, vol. 5(4), Apr. 2006; pp. 221-245.
Gagan L. Choudhury; "Models for IP/MPLS Routing Performance: Convergence, Fast Reroute, and QoS Impact" Keynote Speech, ITCOM's Conference on Performance, Quality of Service and Control of Next Generation Communication Networks II, Philadelphia, PA; 2004.
Robert D. Doverspike; "Fast Restoration in a Mesh Network of Optical Cross-Connects"; Proceedings of Optical Fiber Conference (OFC'99), San Diego, CA, Feb. 1999.

(Continued)

*Primary Examiner* — Kenneth N Vanderpuye
*Assistant Examiner* — Hibret Woldekidan

(57) ABSTRACT

Systems and methods are described for restoring wavelength services in mesh networks using pre-configured, standby lightpaths. The standby lightpaths are pre-cross-connected lightpaths that provide connectivity between switching nodes having a fiber link of degree-2 or higher. The restoration method overcomes the problem of optical impairments for long haul connections, avoids wavelength power balancing delays, provides wavelength conversion for capacity efficiency, and allows sharing of links across nonsimultaneous failures.

12 Claims, 13 Drawing Sheets

OTHER PUBLICATIONS

Guangzhi Li, et al.; "Efficient Distributed Path Selection for Shared Restoration Connections"; IEEE Conference on Computer Communication (INFOCOM2002, New York and Special Issue of IEEE Transactions on Networking, vol. 11 (5), Oct. 2003; pp. 761-771.

D. Ward et al.; "IP Fast-Reroute: Overview and Things We Are Struggling to Solve"; NANOG 33 Meeting, Jan. 31-Feb. 1, 2005, Las Vegas, Nevada.

Gagan L. Choudhury, et al.; "An Algorithm to Compute Blocking Probabilities in Multi-Rate, Multi-Class, Multi-Resource Loss Models"; Advances in Applied Probability, vol. 27, No. 4, pp. 1104-1143, Dec. 1995.

Guangzhi Li, et al.; "Resilience Design in All-Optical ULH Networks", Journal of Optical Networks, 2006.

Angela L. Chiu, et al.; "Joint IP/Optical Layer Restoration After a Router Failure", OFC2001, Anaheim, CA, Mar. 2001.

Panagiotis Sebos, et al.; "Ultra-fast IP Link and Interface Provisioning With Applications to IP Restoration"; IEEE OFC, 2003.

Guangzhi Li, et al.; "IP Over Optical Cross-Connect Architectures"; IEEE OFC, 2003.

Guangzhi Li, et al.; "Efficient Distributed Restoration Path Selection for Shared Mesh Restoration"; IEEE, undated.

\* cited by examiner

SHARED MESH RESTORATION WITH PRE-CONFIGURED STANDBY LIGHTPATHS

CROSS REFERENCE TO RELATED APPLICATIONS

This application claims the benefit of U.S. Provisional Appl. No. 60/936,765, filed on Jun. 21, 2007, the disclosure of which is incorporated herein by reference in its entirety, and is related to U.S. Nonprovisional Application filed on Jun. 18, 2008, the disclosure of which is incorporated herein by reference in its entirety.

BACKGROUND OF THE INVENTION

The invention relates generally to network communications. More specifically, the invention relates to systems and methods that provide a shared mesh restoration with pre-configured, standby lightpaths for restoring services in all-optical reconfigurable network architectures after experiencing a network failure.

Ultra Long Haul (ULH) technologies for Dense Wavelength Division Multiplexing (DWDM) transports are being deployed due to their high-capacity and capital savings. A first-generation ULH network typically includes a set of point-to-point linear systems with each linear system having two terminals. Between the two terminals, there may be one or more Reconfigurable Optical Add-Drop Multiplexers (ROADMs), where traffic may be added or dropped, or expressed through optically by degree-2 ROADMs.

Using these ULH systems, a wavelength connection or lightpath is able to travel a long distance such as 1500 km or more without requiring optical to electronic to optical (OEO) regeneration. This distance limit is referred to as the ULH-reach. An OEO regenerator is needed when a connection length is longer than the ULH-reach. When a connection has to travel through two linear ULH systems, an OEO regenerator is also needed even if its length is within its ULH-reach. Since the OEO regenerators are expensive devices, first generation ULH networks were not inexpensive. They also complicate dynamic reconfiguration and restoration in the Optical Layer (OL).

To reduce the cost of OEO regeneration and enable automatic re-configurability and dynamic restoration via wavelength switching and tuning, next generation optical networks are moving toward an all-optical mesh network. These configurations convert the terminals and degree-2 ROADMs to higher-degree ROADMs to switch and route wavelengths optically, which is known as Photonic Cross Connect (PXC).

FIG. 1 shows a next generation core IP over ROADM over fiber network architecture. The IP network is the overlay network that is transported over the ROADM-based OL network. All of the middle SONET and Digital Cross-Connect System (DCS) layers are eliminated. Traditional sub-wavelength Time Division Multiplexing (TDM) private line service may be transported over the IP network via pseudo-wire circuit emulation with guaranteed minimum latency and quality of service (QoS). Besides providing direct links for the IP layer, the optical network also provides wavelength services via optical connections that comprise one or more wavelengths.

Traffic originates from a source point S to a destination point D and is routed through the network over a series of links. Once traffic is received into its network at the source point S, the network has to route the traffic over a number of different links (the Layer 1 transport network) to have it arrive at the destination point D. Each link segment that the network uses has two ends. Each end of the link segment typically has a router that can detect if traffic is flowing. An inventory of how the traffic flows from source S to destination D lists all the link segments involved. If one of the links fails and the traffic stops flowing, an alarm is sent to a network maintenance (surveillance) system.

Today, large IP backbone networks are deployed directly over sequences of point-to-point Wavelength Division Multiplexing (WDM), Dense WDM (DWDM) systems, or chains of newer ROADM-based ULH systems interconnected by OEO regenerators.

Both IP and wavelength services have stringent quality requirements for their high priority traffic. One requirement is resiliency against network failures that includes performing a sub-second restoration for high priority traffic that has experienced a single link/node failure, and for a small percentage of mission critical traffic, the ability to restore after experiencing multiple link/node failures.

In an all-optical ULH network, dynamically establishing a new restoration connection from scratch involves not only tuning lasers and receivers to the appropriate frequencies and cross connecting the ROADMs/PXCs, but alSo triggering several feedback loop segments that are responsible for power equalization. This is necessary because the new restoration wavelength(s) change the power profile on each link along the restoration path. The whole process can be slow and often unacceptable to large carriers. Unlike opaque optical networks, where OEO conversions occur in the signal path at either the WDM systems if transponders (that incorporate a transmitter and receiver) are present, or switches if transceivers are present, a transparent, all-optical ULH network does not have OEO conversion/regeneration in the signal path and may require OEO regenerators for some nodes.

Optimal regenerator placement becomes a critical problem in all-optical ULH network design. Because of the differences between opaque and transparent optical networks, shared mesh restoration schemes for opaque optical networks cannot be applied to transparent optical ULH networks.

Shared mesh restoration has been used in opaque optical networks where all restoration channels on each link are pre-reserved and each node has wavelength conversion capability. When a failure is detected, a pre-planned restoration path will be dynamically established by cross-connecting any available channel on each link along the pre-planned restoration path. There is no wavelength assignment involved. Previous shared mesh restoration schemes only consider single network failure scenarios.

The challenge in reliable optical network design is to provide fast restoration in conjunction with restoration capacity in a cost effective manner.

What is desired is a sub-second restoration system and method for optical networks that maximizes sharing among single, and multiple network failures to minimize overall network restoration capacity requirements.

SUMMARY OF THE INVENTION

The inventors have discovered that it would be desirable to have systems and methods that provide fast and cost effective restoration for wavelength services. Embodiments provide a shared mesh restoration with pre-configured, standby lightpaths for restoring wavelength services under single or double network failures.

One aspect of the invention provides a method for restoring service in a mesh network using pre-configured, standby lightpaths. Methods according to this aspect of the invention include selecting a service path Ps for provisioning with available capacity, minimizing a number of regenerators required; implementing restoration requirements by selecting restoration paths and reserving standby lightpaths, and after service path Ps selection, restoration paths selection, and standby lightpath reservation, informing network nodes to perform provisioning and restoration via signaling upon network failure.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
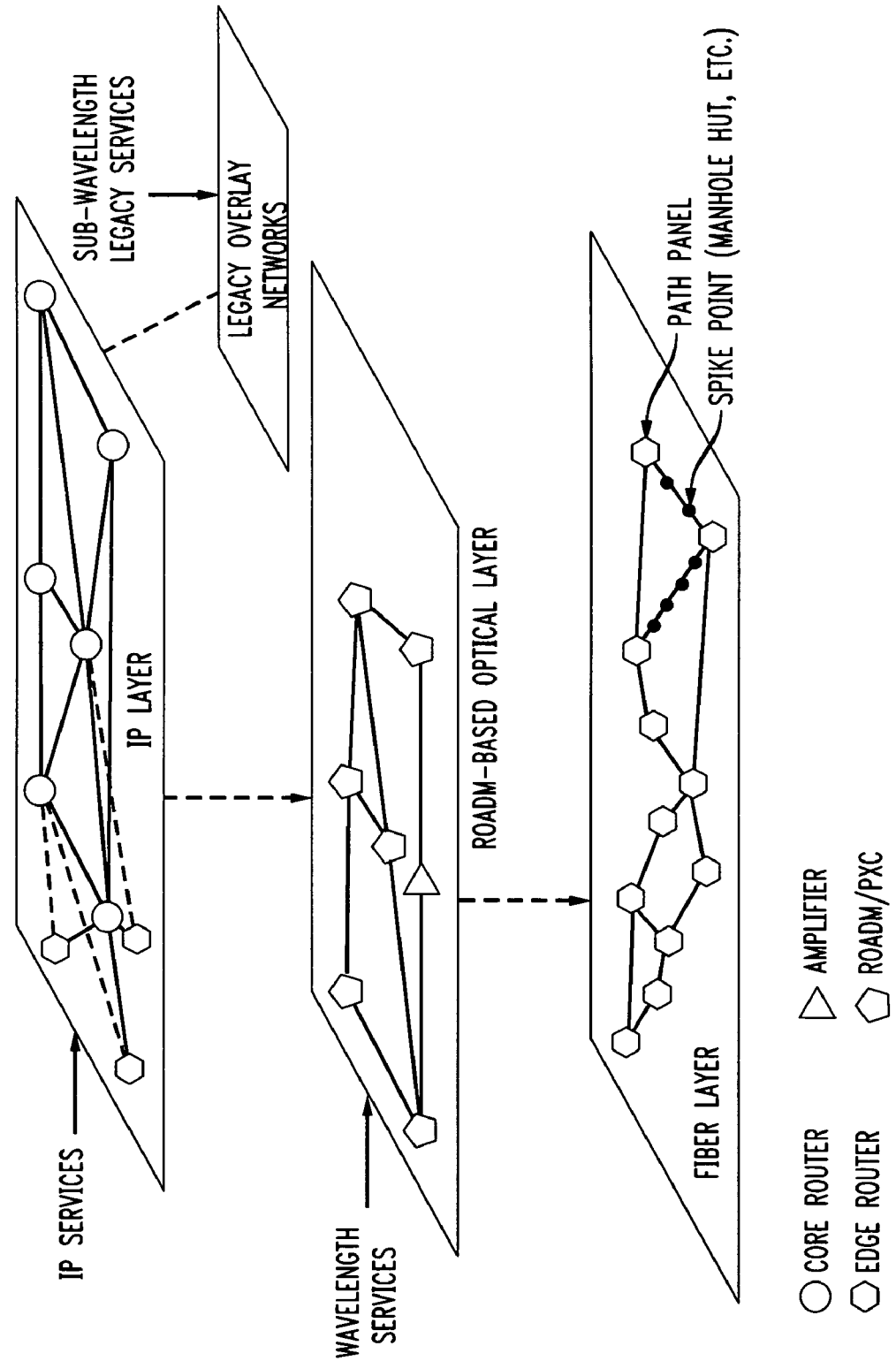
FIG. 1 is an exemplary next generation core IP over ROADM over fiber network architecture.

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions for restoring wavelength services in a mesh network using pre-configured, standby lightpaths. Mesh networks are any network without topology constrains. Ring or linear networks are special cases of mesh networks. The invention is a modular framework and is deployed as software as an application program tangibly embodied on a program storage device. The application code for execution can reside on a plurality of different types of computer readable media known to those skilled in the art.

The standby lightpaths are preestablished lightpaths providing connectivity between switching nodes having a fiber link of degree-2 or higher. A network link is a pair of fibers between two network nodes. Each fiber pair has a fixed amount of wavelengths or channels. A lightpath is a common wavelength crossing one or more network links having a total distance less than the ULH-reach. The restoration method overcomes the problem of optical impairments for long haul connections, avoids wavelength power balancing delays, provides wavelength conversion for capacity efficiency, and allows sharing of restoration capacity across multiple nonsimultaneous failures.

Figure 2B:
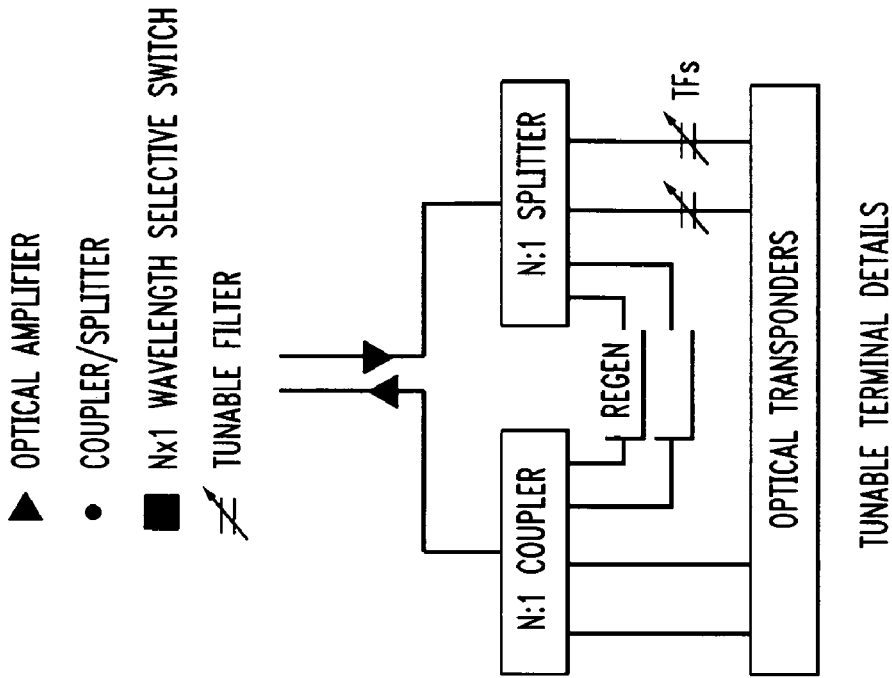
FIG. 2B is an exemplary tunable terminal employed by the ROADM in FIG. 2A.
Figure 2A:
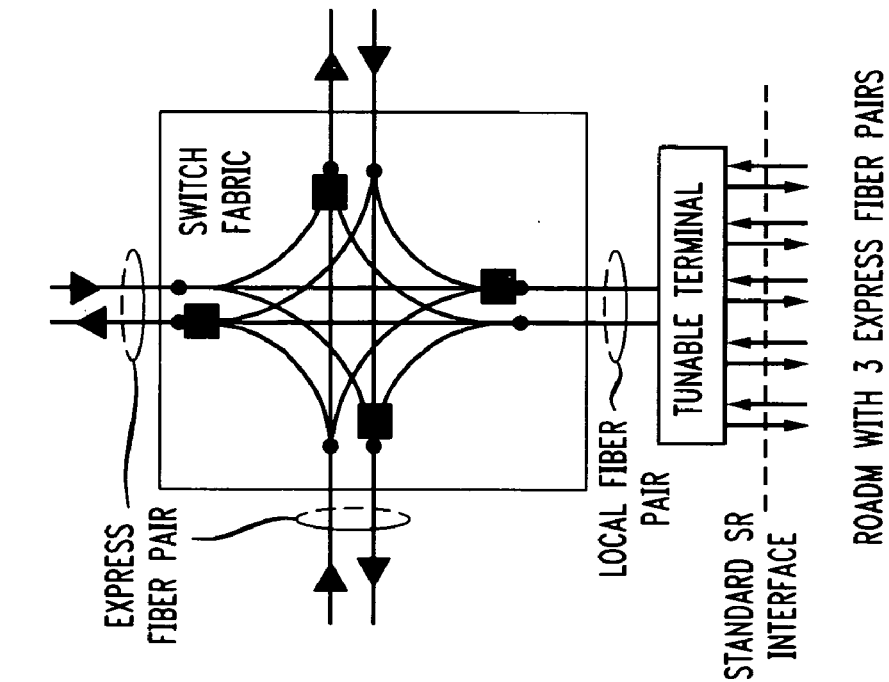
FIG. 2A is an exemplary state-of-the-art ROADM architecture with a broadcast-and-select switch fabric.

The next generation of transparent core optical networks includes ROADM-based network nodes interconnected by multi-wavelength fiber links that include optical amplifiers (OAs) or In-Line Amplifiers (ILAs) arranged in a mesh topology. The nodes are typically multi-degree ROADMs with wavelength blocking and/or wavelength switching capability. The optical network also provides network operators a way to dynamically drop and add wavelengths at network nodes without having to manually balance optical parameters each time when distances traveled by individual wavelengths are changed. FIG. 2A shows a state-of-the-art ROADM architecture with a broadcast-and-select switch fabric. FIG. 2B shows a tunable terminal used by the ROADM. Splitters send copies of each entering multi-channel signal to each output port. N*1 Wavelength Selective Switches (WSSs) are used to choose which of the input channels at each frequency to put on an output fiber. These ROADMs can simultaneously provide power equalization at the channel level.

ROADMs are a form of optical add-drop multiplexer that adds the ability to remotely switch traffic from a WDM system at the wavelength layer. This allows individual wavelengths carrying data channels to be added and dropped from a transport fiber without the need to convert the signals on all of the WDM channels to electronic signals, and back again to optical signals. The main advantages of the ROADM are the planning of the entire bandwidth assignment need not be carried out during initial deployment of a system, the configuration may be performed as and when required. ROADMs allows for remote configuration and reconfiguration.

From the perspective of the switch fabric, the terminal used to add and drop channels is that of a transmit/receive port. It employs tunable lasers and filters that allow any wavelength at a terminal/switch fabric interface to be routed to any terminal transmit/receive port. It also contains regenerators that can perform wavelength translation. Each wavelength can carry a 10 Gbps/40 Gbps or more optical signal.

An optical signal is able to travel a ULH-reach distance (such as 1500 km or more) without requiring OEO regeneration. The ULH-reach is typically rate dependent. The main function of the reconfigurable, transparent optical network is to offer wavelength services as well as providing transport for links at the higher layers, for example, the IP layer.

In a reconfigurable all-optical network, connections at the optical layer come from two major sources: 1) wavelength services, and 2) links of higher layer networks, such as an IP network. In commercial all-optical networks, wavelength services may require no restoration, single failure restoration, and double failure restoration, while IP layer link services usually require no restoration. The reason is that in commercial IP networks, failures are usually restored in the IP layer. Thus IP links are usually provisioned as unrestorable connections in the optical layer.

For restoring wavelength services when a failure occurs in the optical layer (fiber), a 1+1 end-end switch is the only commercial available restoration form in all-optical networks today and is only used for priority circuits. End-end refers to connection end switch initiating protection/restoration. The drawback is that it requires 1 to 1 dedicated backup connections for single failure protection, and 2 to 1 dedicated backup connections for double failure protection, which results in 100% to 300% more restoration overbuild of transport resources due to significantly longer diverse backup paths.

Figure 3:
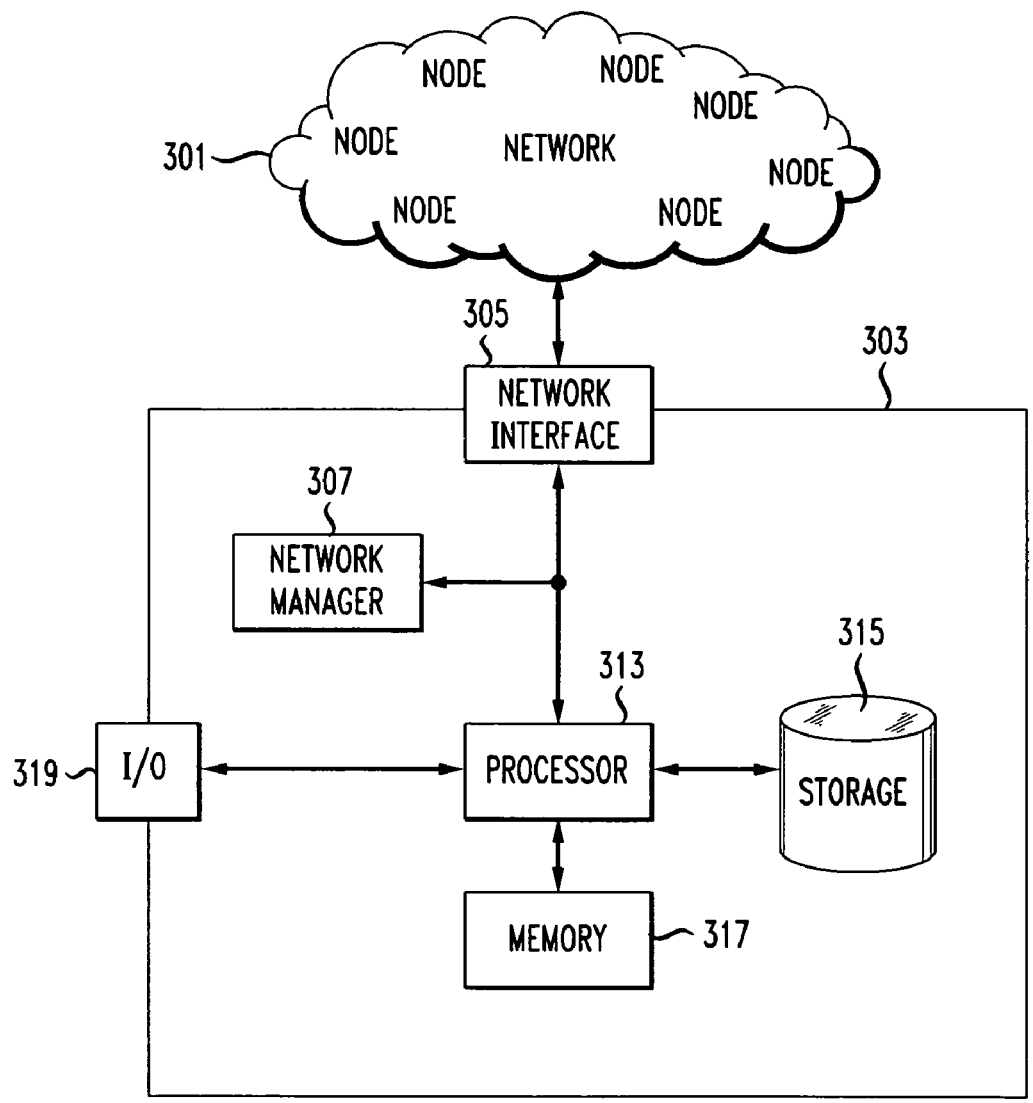
FIG. 3 is an exemplary system framework.
Figure 4:
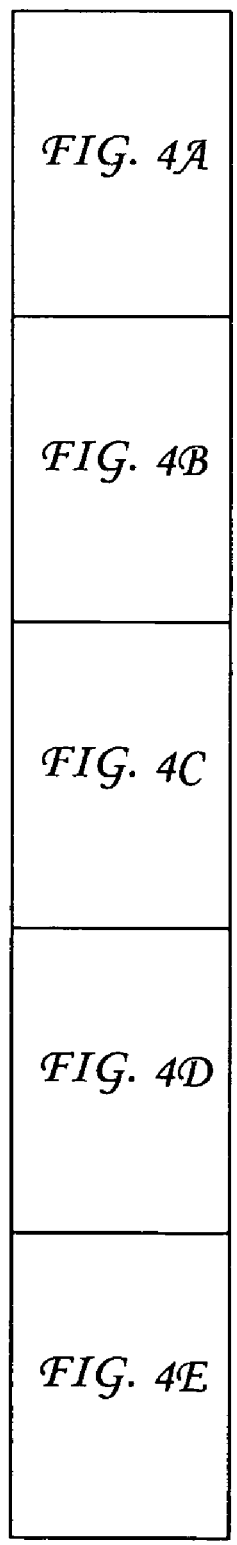
FIG. 4 is an exemplary method.
Figure 4A:
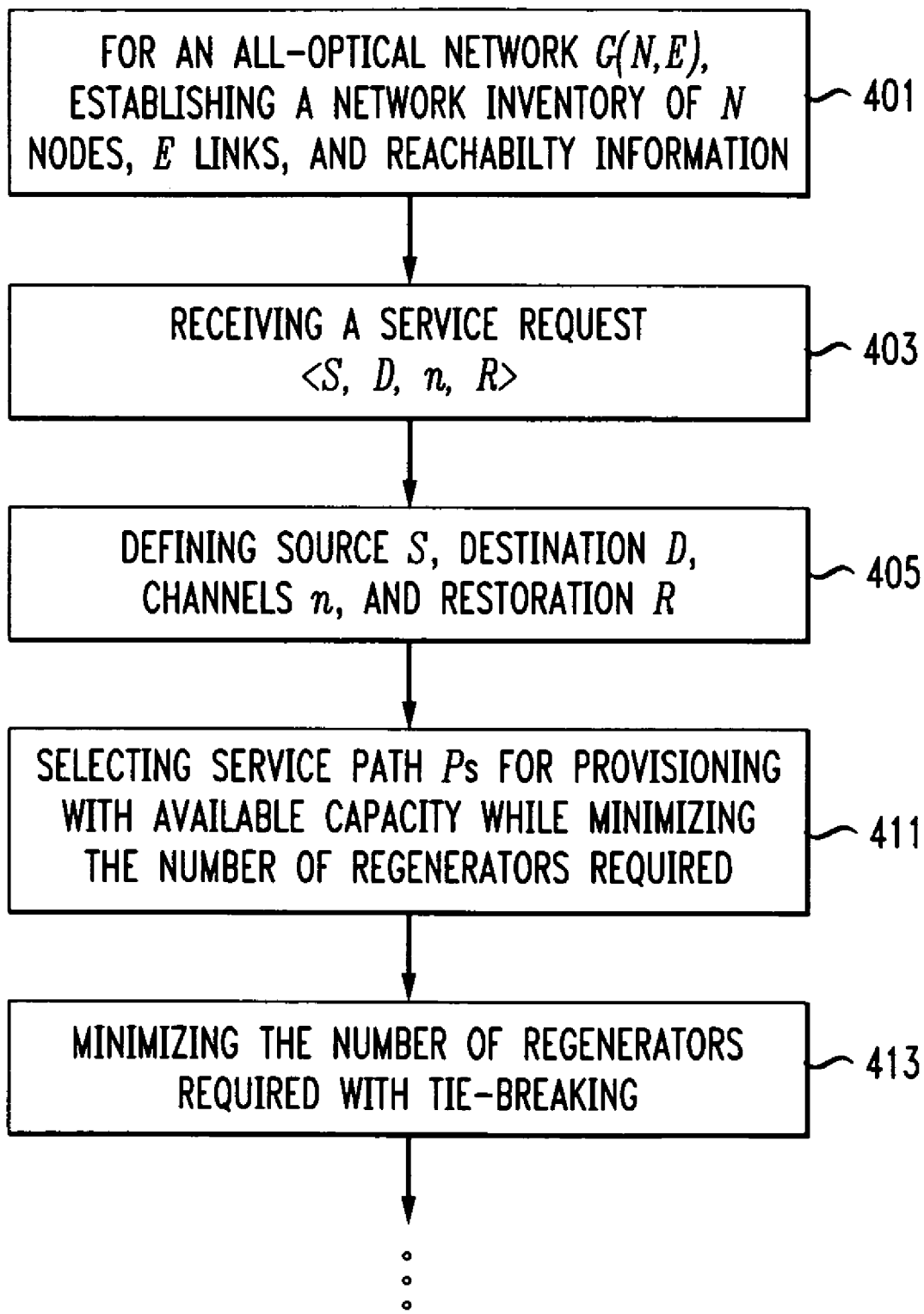
Figure 4B:
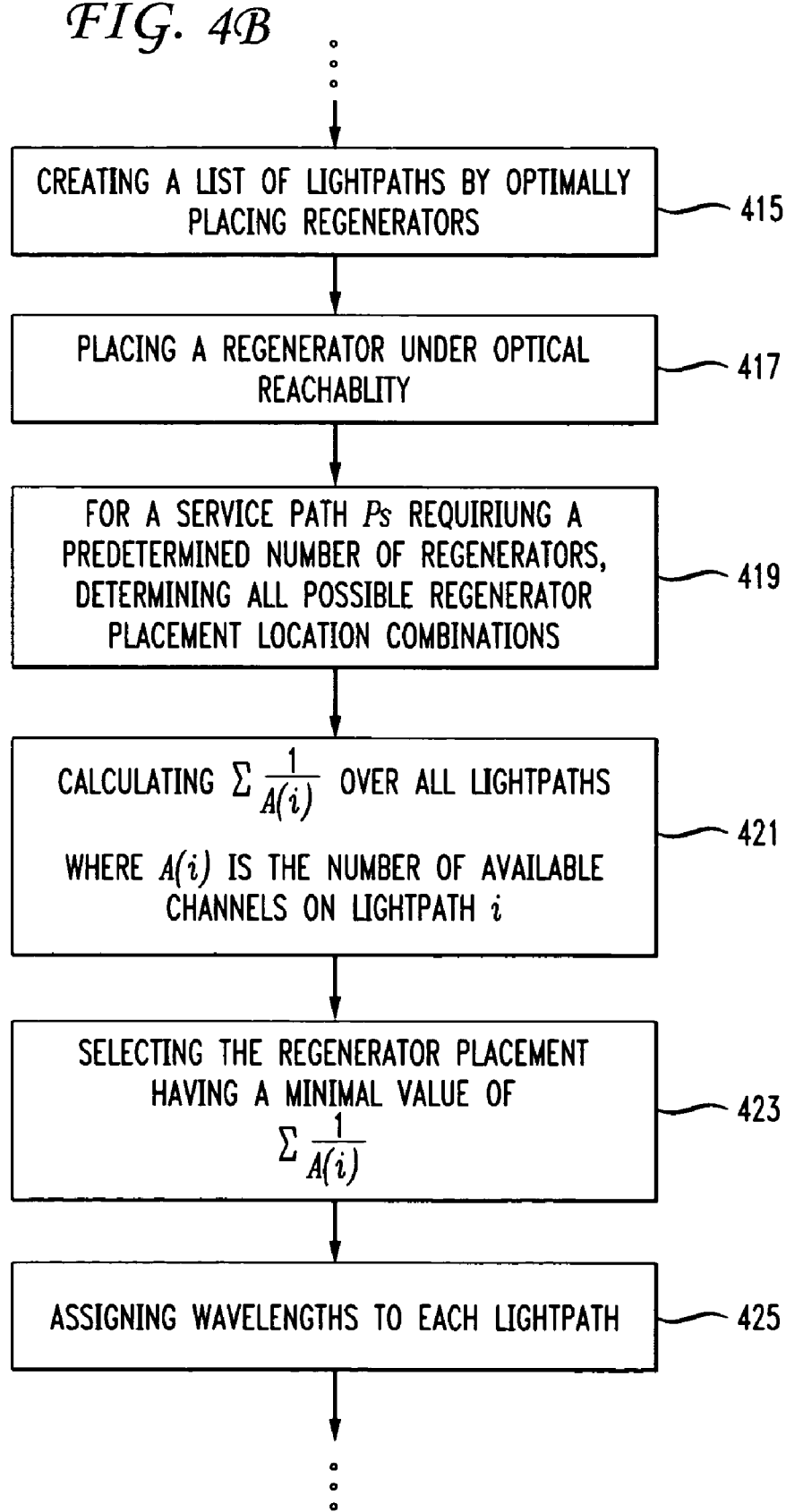
Figure 4C:
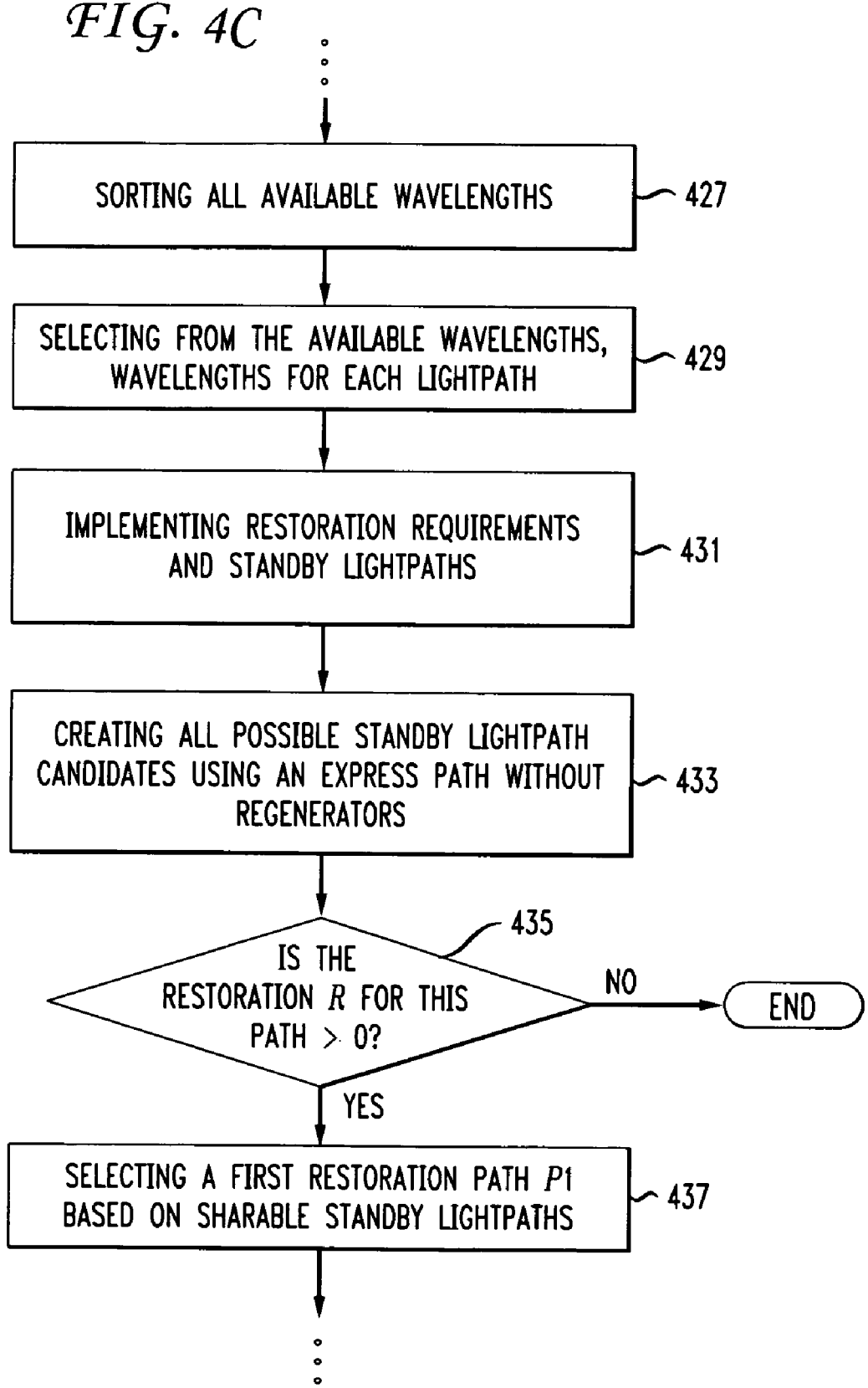
Figure 4D:
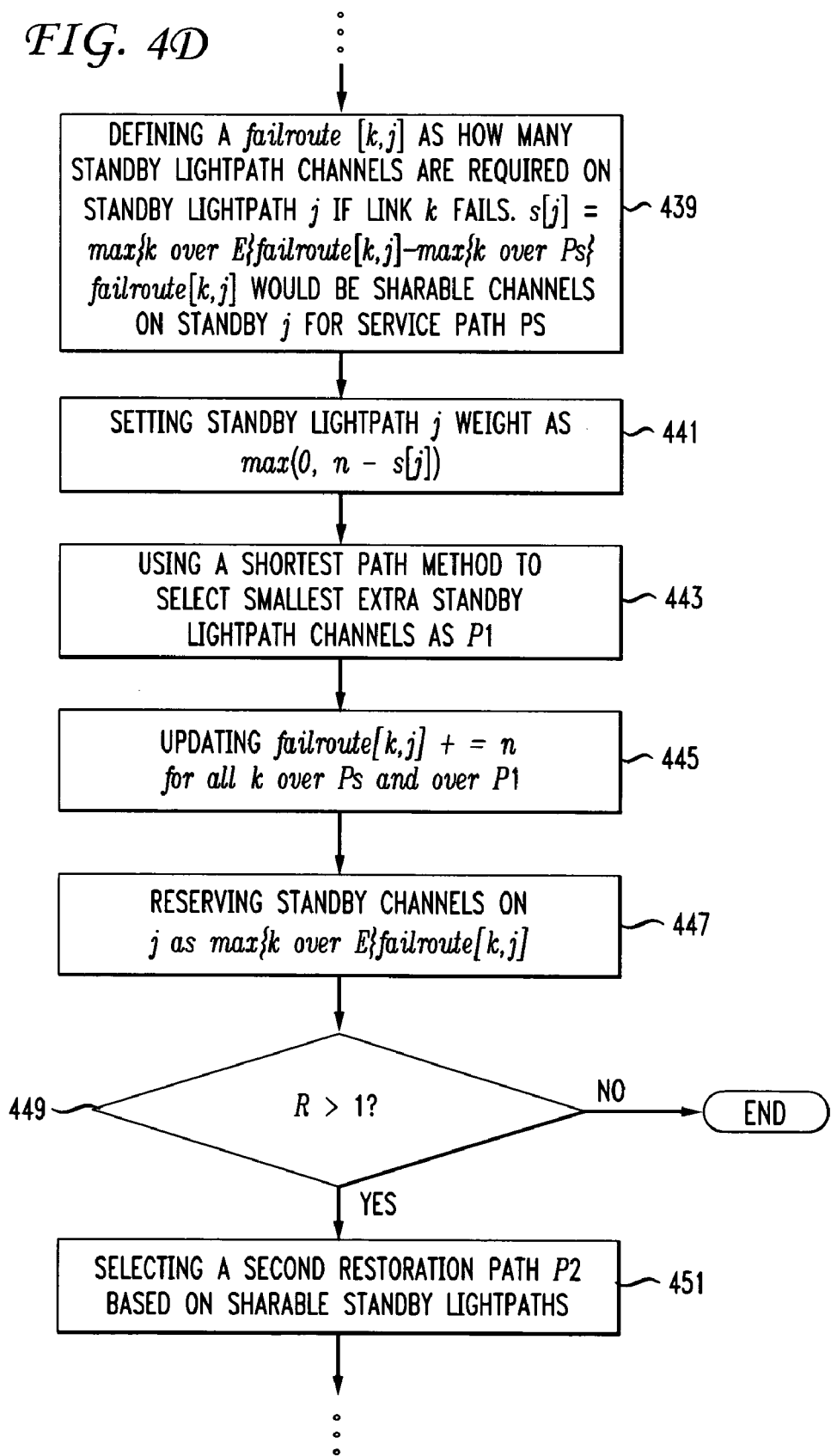
Figure 4E:
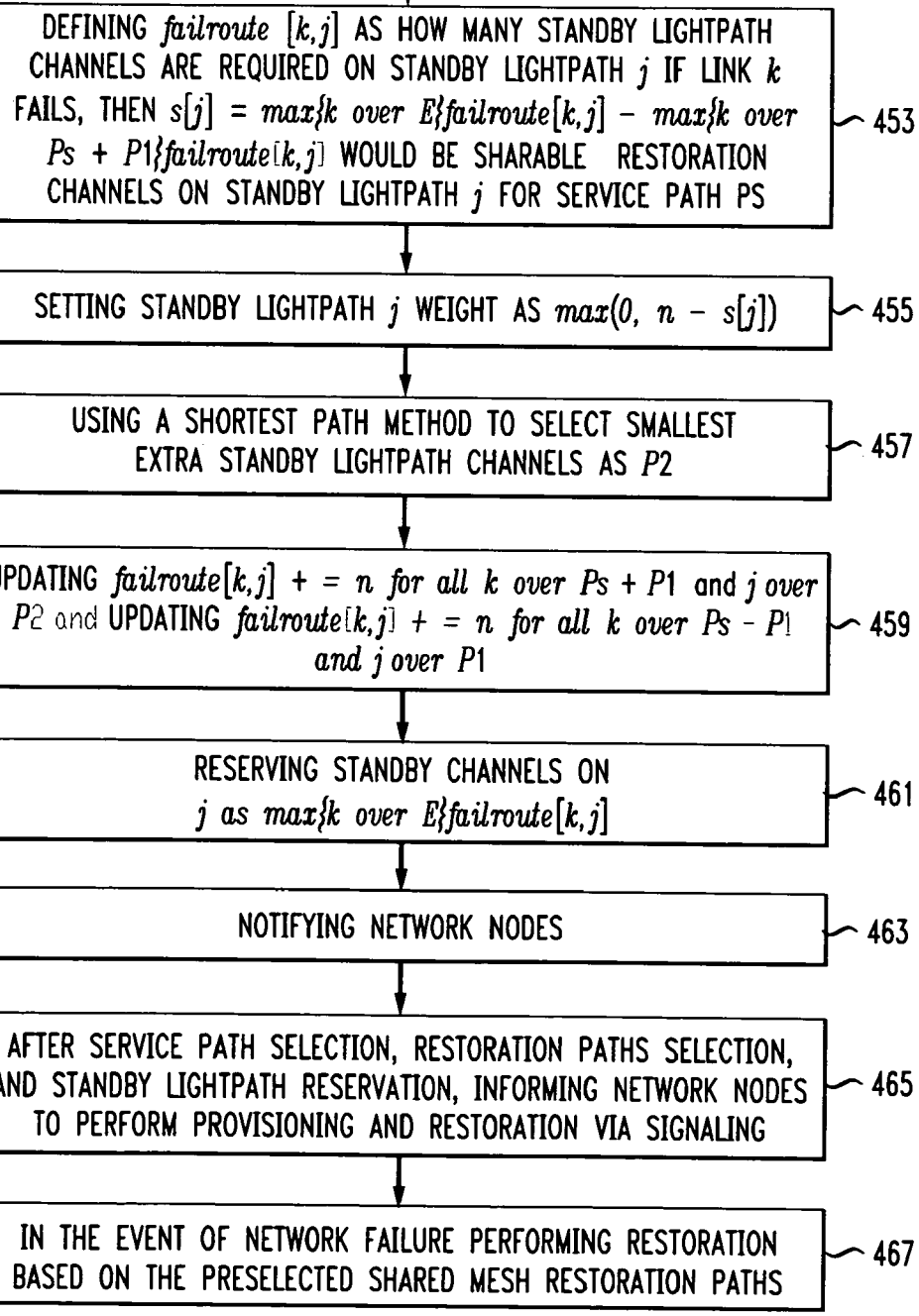

FIG. 3 shows an embodiment of a system 301 framework 303 and FIG. 4 shows a method. The framework 303 which may be part of a network management server includes a network interface 305 coupled to a network and configured to acquire network topology information, network reachability information, as well as network status information to perform network management services. The network interface 305 is coupled to a network manager/inventory database 307, and a processor 313. The processor 313 is coupled to storage 313, memory 317 and I/O 319. The framework 303 stores acquired network data into a data store 315. When the network management system receives a connection service, which may be either a wavelength service or an IP link service from I/O 319, for example, from Los Angeles, Calif. to New York City, N.Y., the framework treats Los Angeles as the source node (S) and New York City as the destination node (D), then performs service path selection and restoration path selection on top of standby lightpaths to maximize restoration capacity sharing. During path selection, a plurality of intervening links may be employed between the two terminating nodes. The network manager 307 deals with this path selection and capacity management tasks.

When a network fails, network alarms are transmitted asynchronously to the network manager 307. The network manager would trigger the restoration process for each affected connection using preselected restoration paths. Since the standby lightpaths are preestablished and capacity is pre-reserved, the signaling messages only need to tune OEO regenerators between two standby lightpaths to create an end-to-end restoration path in real-time.

The framework 303 may be implemented as a computer including a processor 313, memory 317, storage devices 315, software and other components. The processor 313 is coupled to the network interface 305, I/O 319, storage 315 and memory 317 and controls the overall operation of the computer by executing instructions defining the configuration. The instructions may be stored in the storage device 315, for example, a magnetic disk, and loaded into the memory 317 when executing the configuration. The invention may be implemented as an application defined by the computer program instructions stored in the memory 317 and/or storage 315 and controlled by the processor 313 executing the computer program instructions. The computer also includes at least one network interface 305 coupled to and communicating with a network such as shown in FIG. 1 to interrogate and receive network configuration or alarm data. The I/O 319 allows for user interaction with the computer via peripheral devices such as a display, a keyboard, a pointing device, and others.

Figure 5:
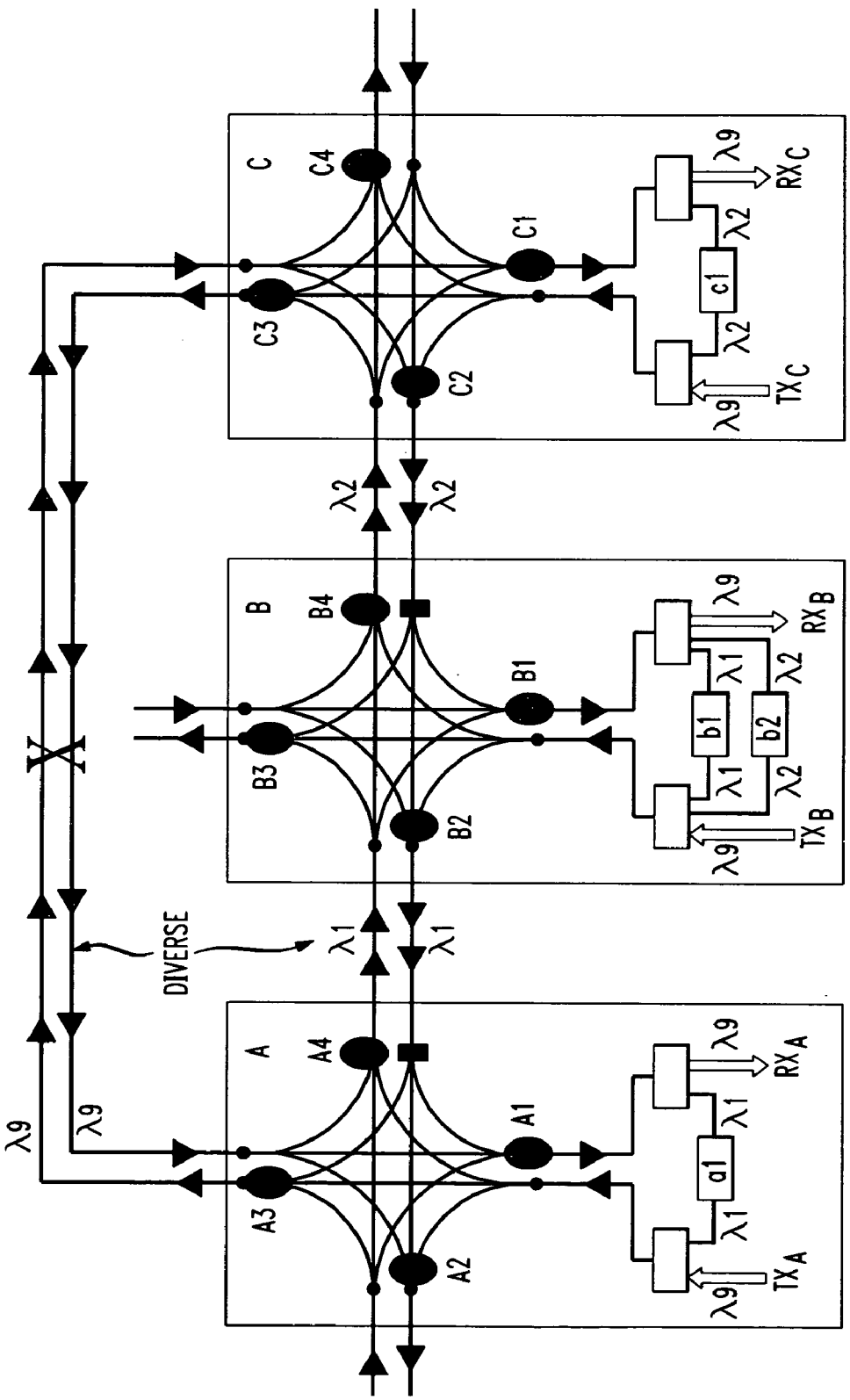
FIG. 5 is an exemplary standby restoration.

To provide fast and cost effective restoration, embodiments use shared mesh restoration with standby lightpaths. The standby lightpaths provide connectivity between switching nodes (nodes with a degree-2 or higher fiber link). All-optical switching is used at the intermediate nodes along a standby lightpath. The standby lightpaths may be pre-configured using OEO regenerators at their two ends which send test signals continuously. The test signals overcome the problem of optical impairments for long connections, avoid wavelength power balancing delays, provide wavelength conversion for capacity efficiency, and allow sharing of links across nonsimultaneous failures. The preestablished standby lightpaths form a standby overlay network on top of the all-optical network. FIG. 5 shows one example of standby lightpath restoration.

In FIG. 5, the restoration path comprises two preestablished standbys, A-B, and B-C, carried on wavelength $\lambda 1$ and $\lambda 2$ using regenerator cards A1/B1 and B2/C1 respectively. There could be other ULH nodes in the network, and other ULH nodes between the service path and standby lightpaths. The standby lightpaths pass through all internal ULH nodes transparently. When a fiber is cut on the service path from A to C (X on FIG. 5), the restoration path needs to be established using these two standbys: A-B and B-C.

To restore the signal going from A to C, the following steps occur: (1) at office A, shut down the laser at regenerator card A1 and tune transmitter $TX_A$'s laser from $\lambda 9$ to $\lambda 1$. The signal rides along the standby A-B and arrives at terminal B; (2) at office B, receive the signal from standby A-B using regenerator card B2 instead of B1 by tuning the filter to $\lambda 1$ and regenerates the signal to $\lambda 2$. The signal on $\lambda 2$ rides along the standby B-C and arrives at terminal C; (3) $RX_C$ receives the signal by tuning the filter to $\lambda 2$. To restore the signal going from C to A, similar steps are required: (1) at office C, shut down the laser at regenerator card C1 and tune transmitter $TX_C$'s laser from $\lambda 9$ to $\lambda 2$. The signal rides along the standby C-B and arrives at terminal B; (2) at office B, receive the signal from standby C-B using regenerator card B1 instead of B2 by tuning the filter to $\lambda 2$ and regenerate the signal to M. The signal on $\lambda 1$ rides along the standby B-A and arrives at terminal A; (3) $RX_A$ receives the signal by tuning the filter to $\lambda 1$. Note that the above procedures may be performed in parallel to reduce the restoration time.

For a transparent optical ROADM network, wavelengths on an optical link cannot be connected in series to create a restoration path due to wavelength continuity, ULH-reach, and power equalization. Embodiments pre-place OEO regenerators strategically in the network, and preestablish necessary standby lightpaths for restoration purposes between regenerators.

During a restoration, the standby lightpaths are dynamically connected together in series to provide a desired restoration path around the fault. Since the standby lightpaths are preestablished, meaning that the restoration wavelengths are actively present on the standby (restoration) lightpaths, optical transients associated with energizing lasers would not be an issue when that lightpath needed for restoration is required. This allows the restoration method to be performed rapidly. The standby lightpaths may be shared among multiple restoration paths by controlling the filters and regenerators at standby terminals, as shown in FIG. 5.

Different from opaque optical networks where restoration channels are pre-installed on each network link, embodiments reserve restoration channels on preestablished standby lightpaths, which are restoration connections between OEO regenerators. The standby restoration is performed on the standby lightpaths bypassing the underlying transparent all-optical network. The restoration time for embodiments in place on transparent optical networks is equivalent to existing opaque optical network restoration time, which achieves sub-second restoration on average using signaling messages.

To reduce network cost, service providers may preestablish as few restoration standby lightpaths as possible since standby lightpaths are reserved and not used to transfer traffic during normal network operation. To guarantee full restoration of any single, or double failures, service providers may preestablish a minimum necessary amount of standby lightpaths.

The question is where, and how many standby lightpaths a network should preestablish, in conjunction with where, and how many OEO regenerators the network should pre-placed in advance for restoration purposes.

Embodiments for the optical layer restoration method include a service path selection method, OEO regenerator placement, wavelength assignment, shared mesh restoration with pre-configured standby lightpaths, and multiple failure restorable connection methods.

For an optical network G(N,E), a network inventory of N nodes, E links, and Reachability information is established (step 401). After receiving a user service request <S, D, n, R> (step 403), source S, destination D, channel size n, and restoration requirement R (R=0: no restoration, R=1: single failure restoration, R=2: double failure restoration) are determined (step 405).

Due to wavelength continuity constraints in transparent optical networks, a service path Ps is selected to minimize the number of regenerators required using tie-breaking of a small number of hops (steps 411, 413). Once the number of regenerators is determined, placement of the OEO regenerators is determined in conjunction with considering the number of available wavelengths.

A list of lightpaths is created by optimally placing regenerators (step 415) with optical reachability (step 417), where a lightpath is an optical path without a regenerator. Since an OEO regenerator separates a fiber connection into multiple lightpaths, the available number of wavelengths on each lightpath may be calculated by examining all wavelengths crossing all links of the lightpath.

Embodiments penalize a configuration which spends the last few available wavelengths on their paths. The OEO regenerator placement method minimizes the sum of the inverse of available wavelengths over all separated lightpaths, i.e., for each regenerator placement, the embodiment calculates $$\sum \frac{1}{A(i)} \qquad (1)$$

where A(i) is the number of available wavelengths on lightpath i with the OEO regenerator placement. Then, embodiments select the regenerator configuration with minimal value. (1) gives a high value for one of the lightpaths having only a few wavelengths still available. It balances the number of available wavelengths on all lightpaths.

For a service path Ps requiring a predetermined number of regenerators, all possible regenerator placement location combinations are determined (step 419). (1) determines the number of available channels on lightpath i (step 421). Regenerators are placed having a minimal value of (1) (step 423).

A first-fit wavelength assignment method is employed. The wavelengths are ordered from 1 to W, where W is the maximum number of wavelengths that the system supports, and selects the smallest available wavelength along the lightpath.

As described above, all optical connections are separated into lightpaths via regenerators. Since a regenerator provides wavelength conversion capability, only each lightpath has the wavelength continuity constrain.

Using standby lightpaths and regenerators, the path-based shared mesh restoration is applied to transparent optical networks. Restoration capacity sharing is on top of standby lightpaths instead of optical links. Each wavelength supports one OC-192/OC-768 connection and each OC-192/OC-768 demand is routed independently one at a time.

Wavelengths are assigned to each lightpath (step 425) using a simple heuristic of a first-fit method (steps 427, 429).

To implement shared mesh restoration with pre-configured standby lightpaths, embodiments deal with optical signal reach constraints using express links (step 431) that are within the maximum optical signal reach distance on the network. The express links are standby lightpath candidates. A potential path between any two nodes is calculated and an extended network is formed by adding express links over the original optical network. (step 433).

If at least one restoration path is specified by the customer, where R is greater than 0, the method proceeds to establish a first restoration path P1 (steps 435, 437). To select a restoration path with the minimum number of restoration wavelengths in the network for service path Ps, a matrix failroute [k, j] is used and maintained where failroute[k,j] indicates how many standby lightpaths are needed on express link j if link k fails. Then, $$\max\{k \text{ over } E\}\text{failroute}[k,j] \text{ and } \max\{k \text{ over } Ps\}\text{failroute}[k,j], \qquad (2)$$

represents the total standby channels reserved on link j and the minimal required standby channels required on link j if service path Ps fails, where E is the set of network links and k over E means k value ranges over all values of E, k over Ps means k value ranges over all links in Ps. The difference, $$s[j] = \max\{k \text{ over } E\}\text{failroute}[k,j] - \max\{k \text{ over } Ps\}\text{failroute}[k,j], \qquad (3)$$

is the amount of sharable standby channels on link j (step 439), and $$\max(0, n-s[j]) \qquad (4)$$

is the additional required channels on link j if path Ps fails.

After service path Ps is defined, link weights for the extended network (the extended network is defined as the original optical network plus all express links) are set for additional required channels (step 441) and the smallest new link weight path is selected as the restoration path P1, which should be the smallest number of extra restoration channels in a required path. After Ps and P1 are selected, the matrix failroute[k,j] is updated failroute[k,j]+=n for all k over Ps, and j over P1 (steps 443, 445). After all connections are routed on the network, each express link j would have $$\max\{k \text{ over } E\}\text{failroute}[k,j] \qquad (5)$$

restoration channels, and each restoration channel is a standby lightpath (step 447).

A determination is made according to a customer's fault tolerance regarding if the restoration for his service path Ps is greater than 1, i.e., more than single failure restoration (step 449). If not, the method terminates. If the fault tolerance R is greater than 1, i.e., double failure restoration is required, a second restoration path P2 is determined based on sharable standby lightpaths (step 451).

To deal with double failures, another failure disjoint path is needed. After service path Ps is selected and the first restoration path P1 is selected, the second restoration path P2 is selected using shared mesh restoration with pre-configured standby lightpaths. Since $$\max\{k \text{ over } E\}\text{failroute}[k,j] - \max\{k \text{ over } Ps+P1\}\text{failroute}[k,j] \quad (6)$$

represents the total standby channels reserved on link j and the minimal required standby channels required on link j if both service path Ps and the first restoration path P1 fail, where E is the set of network links and Ps+P1 means the union of network links from Ps and P1. The difference, $$s[j] = \max\{k \text{ over } E\}\text{failroute}[k,j] - \max\{k \text{ over } Ps+P1\}\text{failroute}[k,j], \quad (7)$$

is the amount of sharable standby channels on link j (step 453), and $$\max(0, n-s[j]) \quad (4)$$

is the additional required channels on link j if path Ps and path P1 fail.

The link weights for the extended network are set as additional required channels (step 455) and the smallest new link weight path is selected as the second restoration path P2, which should be the smallest number of extra restoration channels in a required path (step 457). After P2 is selected, the matrix failroute[k,j] is updated failroute[k,j]+=n for all k over Ps+P1, and j over P2 as well as failroute[k,j]+=n for all k over Ps−P1, and j over P1 (step 459). After all connections are routed on the network, each express link] would have $$\max\{k \text{ over } E\}\text{failroute}[k,j] \quad (5)$$

restoration channels, and each restoration channel is a standby lightpath (step 461).

After all of the standby lightpaths are determined in accordance with the level of a customer's fault tolerance, the framework 303 notifies the network nodes (step 463). Standby lightpath determination includes service path selection, restoration paths selection, and standby lightpath reservation. The framework 303 informs the network nodes to perform provisioning and restoration via signaling (step 465). In the event of a service path Ps failure, restoration is performed based on the preselected shared mesh restoration path (step 467). In the event of one restoration path P1 failure and the related customer service requires double failure restoration, restoration is again performed based on the preselected shared mesh restoration path P2 (step 467).

Figure 6:
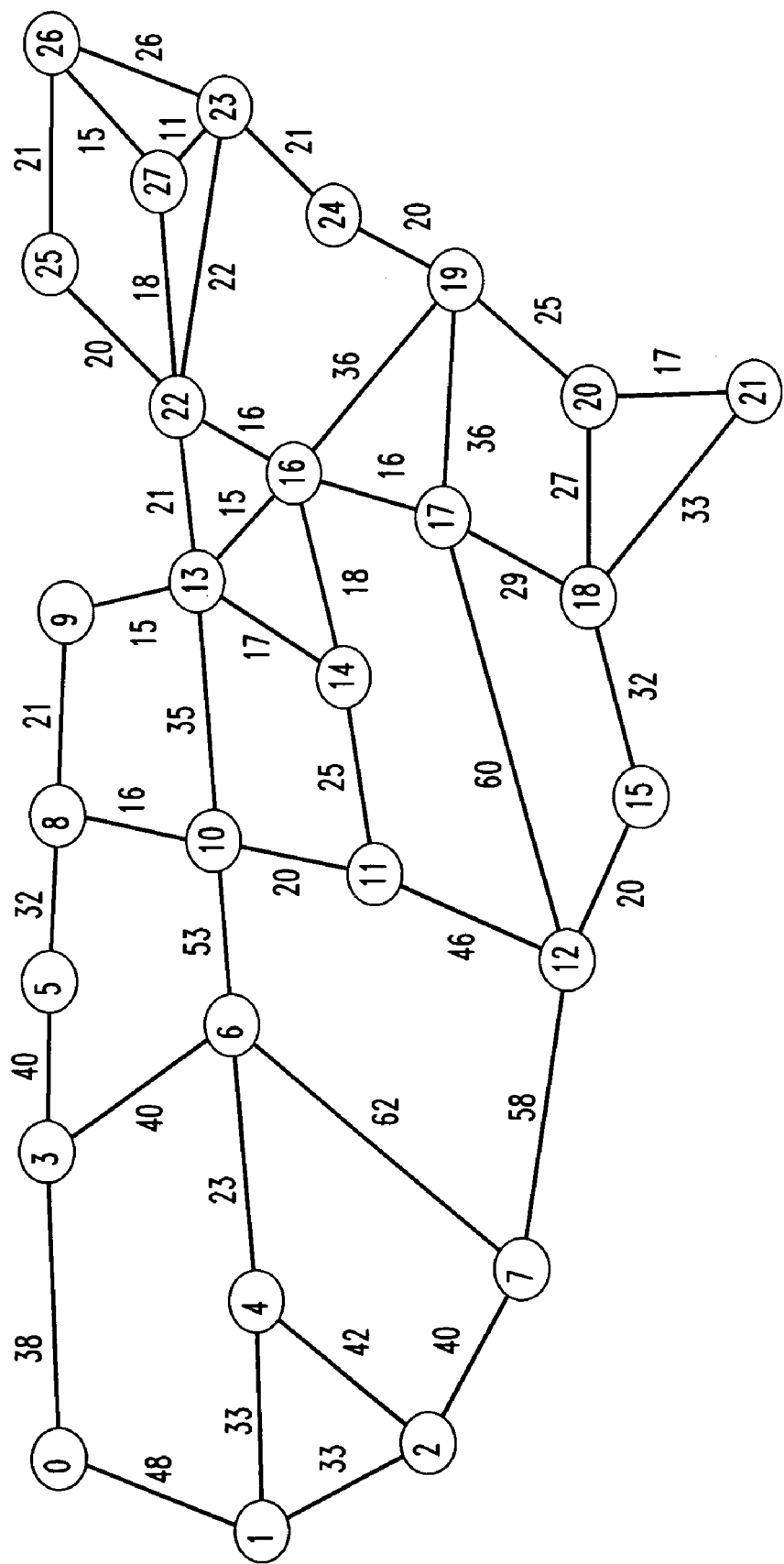
FIG. 6 is an exemplary IP backbone network.

An evaluation was performed via a simulation on a hypothetical backbone network comprising 28 nodes and 45 fiber links. FIG. 6 shows the exemplary backbone network. The number over each link is the distance between two nodes in 10 mile units. Each node comprises one router and one ROADM. Each fiber pair is assumed to support 100 wavelengths. There are two types of traffic generated at each node, IP traffic, and wavelength traffic. All traffic demands are generated based on node traffic probability, which is proportional to the node degree. A demand was randomly selected according to source node traffic probability and destination node traffic probability. For IP traffic, the bandwidth of each demand is uniformly generated from an interval (100, 1000) Mbps and there are 5,000 such demands. Each IP demand flow has a 40% chance to be best effort traffic and a small probability (up to 10%) requiring double failure restoration. For simplicity, the IP link bandwidths are assumed to be deployed in units of 10 Gbps channels (the associated IP port may either be an OC-192 port or a 10 Gigabit Ethernet port, the latter being less expensive). For each IP link the OSPF Administrative Weight metric is assumed to be distance plus 20 miles (this allows OSPF shortest path routing to be shortest distance routing as well in most cases but in the event of two nearly equal distance paths it chooses one with fewer hops). For wavelength traffic, each demand is assumed to require one wavelength and all demands need to be single failure protected at least. A small percentage of wavelength demands (up to 10%) need to be double failure restorable.

In the simulation, it is assumed that wavelength demands arrive at the network one by one, and are never disconnected (or more realistically, have holding times in years), which is typical for commercial wavelength services. For both IP service and wavelength service restoration, the performance of the method is evaluated using restoration overbuild, which is defined as $$\frac{\text{total wavelength mile for both service and restoration}}{\text{wavelength mile for service}} - 1. \quad (8)$$

The wavelength service restoration method is compared with existing commercialized 1+1 for single failure protection and 1+2 for double failure protection. For shared mesh restoration with standby lightpaths, the method selected the restoration paths. For 1+1 or 1+2 protection, the shortest disjoint restoration paths were used.

Figure 7:
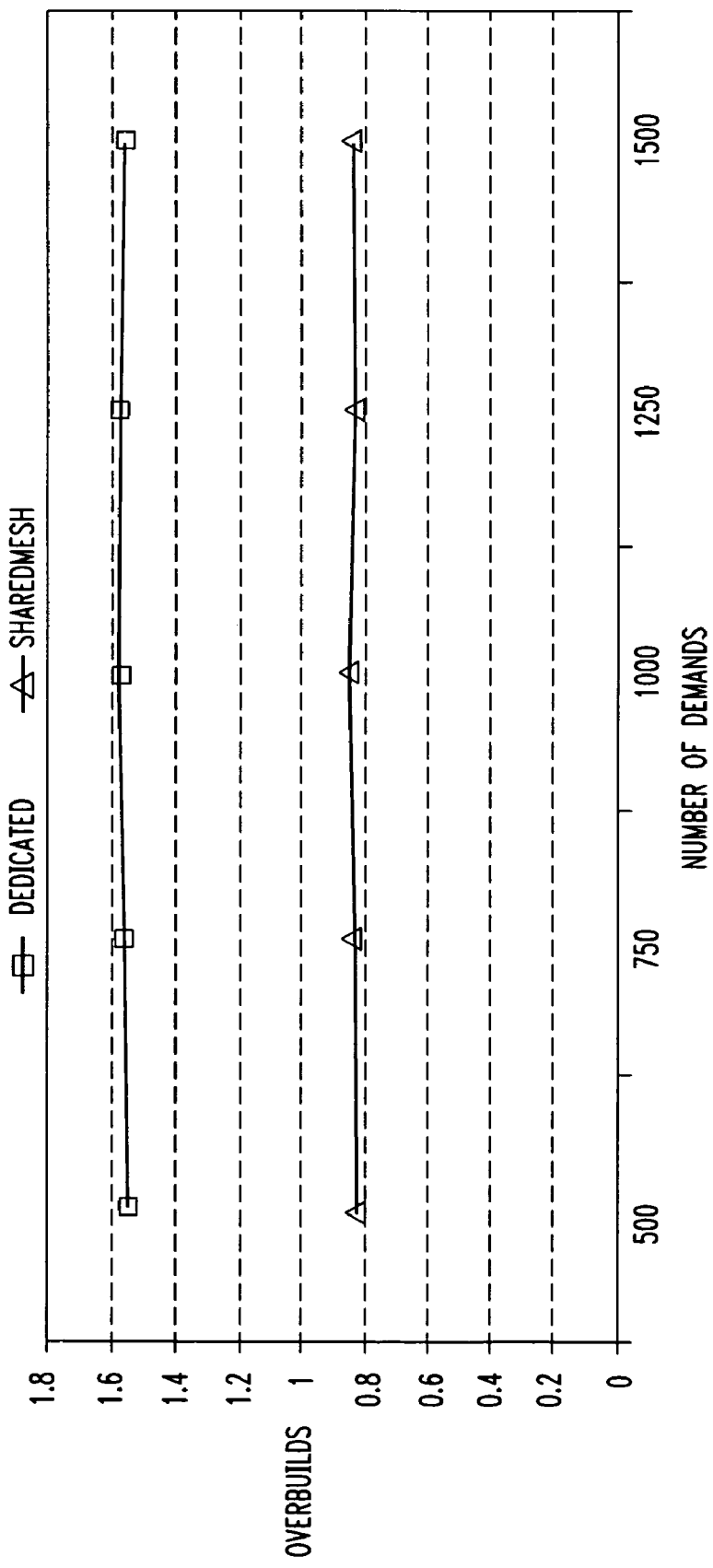
FIG. 7 is an exemplary plot comparing an experimental restoration overbuild with a fixed 5% double failure ratio.
Figure 8:
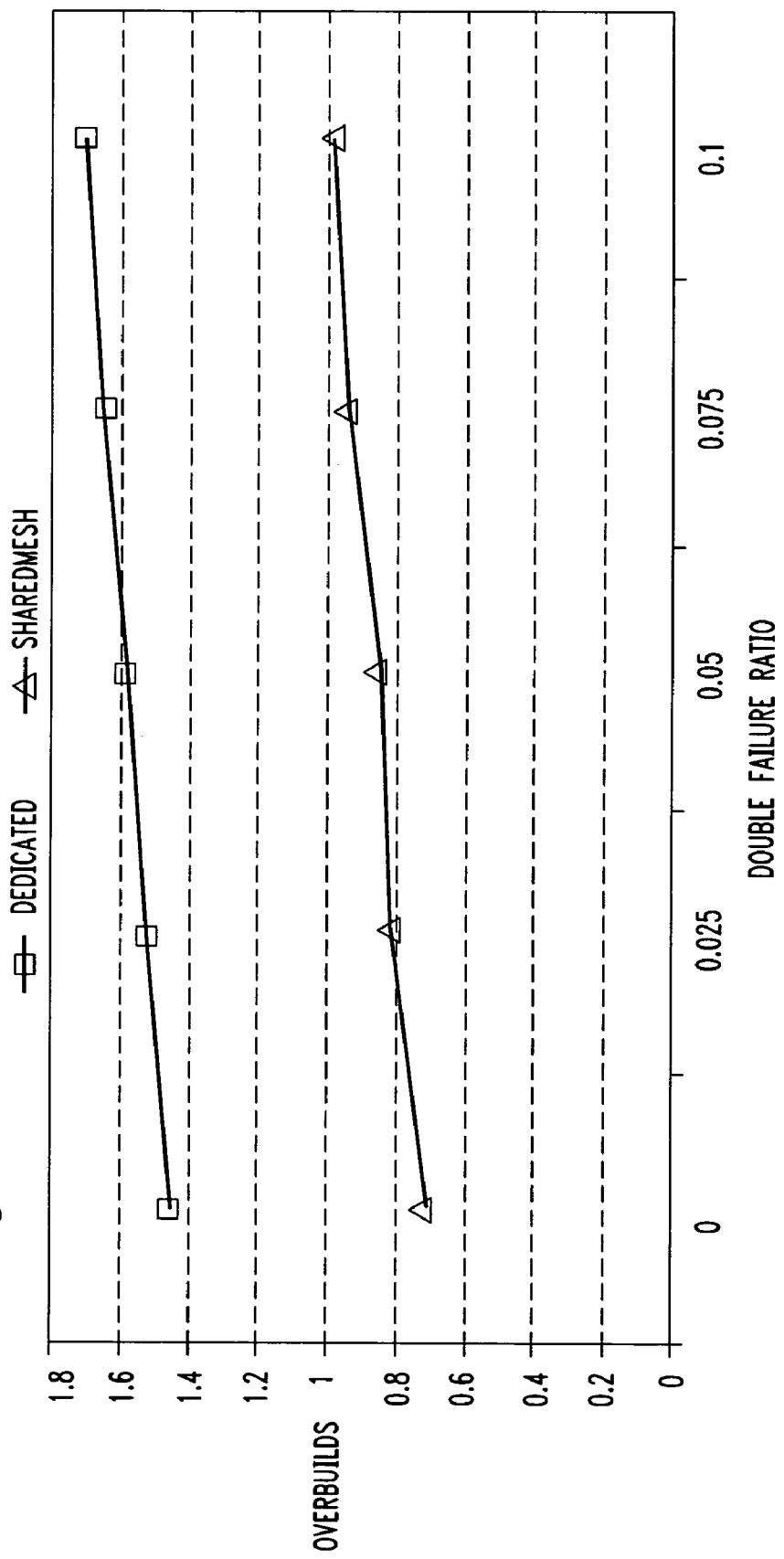
FIG. 8 is an exemplary plot comparing an experimental restoration overbuild with a fixed 1000 number of wavelength services.

To evaluate the impact of traffic size, the double failure restoration ratio is fixed at 5% and increase wavelength demands increase from 500 to 1500 at a step size of 250. The number of wavelength demands are fixed at 1000 and the double failure ratio is increased from 0% to 10% in step size of 2.5% to evaluate the impact of demand double failure restoration requirement. For both cases, the restoration overbuilds of both schemes are compared. FIGS. 7 and 8 show the simulation results.

FIG. 7 shows that 1+1 protection results in very high restoration overbuild around 150% while the shared mesh restoration with standby lightpaths shows significant improvement by reducing the overbuild by 50% for all demand sizes studied.

FIG. 8 shows that as the double failure ratio is increased from 0% to 10%, restoration overbuilds for both 1+1 protection and the shared mesh restoration with standbys method increase steadily. Meanwhile, the improvements in restoration overbuild for the embodiment over 1+1 protection stay close to 50% for all double failure ratios.

One or more embodiments of the present invention have been described. Nevertheless, it will be understood that various modifications may be made without departing from the spirit and scope of the invention. Accordingly, other embodiments are within the scope of the following claims.

What is claimed is:

1. A non-transitory computer readable medium having recorded thereon a computer program comprising code means for, when executed on a computer, instructing the computer to control steps in a method for restoring service in a mesh network using pre-configured, standby lightpaths comprising:

selecting a service path Ps for provisioning with available capacity comprising:
  minimizing the number of regenerators required using tie-breaking;
  creating a list of lightpaths by optimally placing regenerators comprising:
    locating a regenerator under optical reachability;
    for a service path Ps requiring a predetermined number of regenerators, determining all possible regenerator placement combinations;

calculating $$\sum \frac{1}{A(i)}$$

over all lightpaths where A(i) is the number of available channels on lightpath i; and selecting the regenerator placement having minimal $$\sum \frac{1}{A(i)};$$

and assigning wavelengths to each lightpath; and minimizing a number of regenerators required;

implementing restoration requirements by selecting restoration paths and reserving standby lightpaths; and after service path Ps selection, restoration paths selection, and standby lightpath reservation, informing network nodes to perform provisioning and restoration via signaling.

2. The non-transitory computer readable medium according to claim 1 wherein assigning wavelengths to each lightpath further comprises:

sorting all available wavelengths; and selecting from the available wavelengths for each lightpath.

3. The non-transitory computer readable medium according to claim 1 wherein implementing restoration requirements further comprises:

creating all possible standby lightpath candidates using an express path without regenerators;

if at least a single fault restoration is desired, selecting a first restoration path P1 based on sharable standby lightpaths;

if at least a double fault restoration is desired, selecting a second restoration path P2 based on sharable standby lightpaths.

4. The non-transitory computer readable medium according to claim 3 wherein selecting a second restoration path P2 further comprises:

defining failroute[k,j] as how many standby lightpath channels are required on standby lightpath j if link k fails where s[j]=max{k over E}−max{k over Ps+P1}failroute[k,j] would be sharable channels on standby j for path Ps+P1, where Ps+P1 is defined as a double failure combination of one link from Ps and one link from P1;

setting standby lightpath j weight as max(0, n−s[j]);

using a shortest path method to select the smallest diverse extra standby lightpath channels as P2;

updating failroute[k,j]+=n for all k in Ps+P1, and j in P2, and updating failroute[k,j]+=n for all k in Ps−P1 and j in P1, where Ps−P1 is defined as a double failure combination of one link from Ps and one link not from P1; and reserving standby channels on j as max{k over E}failroute[k,j].

5. The non-transitory computer readable medium according to claim 3 wherein selecting a first restoration path P1 further comprises:

defining a failroute[k,j] as how many standby lightpath channels are required on standby lightpath j if link k fails where s[j]=max{k over E}failroute[k,j]−max{k over Ps}failroute[k,j] would be sharable channels on standby j for service path Ps;

setting standby lightpath j weight as max(0, n−s[j]);

using a shortest path method to select the smallest diverse extra standby lightpath channels as P1;

updating failroute[k,j]+=n for all k over Ps, and j over P1; and reserving standby channels on j as max{k over E}failroute[k,j].

6. The non-transitory computer readable medium according to claim 1 wherein informing network nodes to perform provisioning and restoration via signaling further comprises in the event of a service path Ps failure, performing restoration based on the preselected shared mesh restoration path.

7. A system for restoring service in a mesh network using pre-configured, standby lightpaths comprising:

means for selecting a service path Ps for provisioning with available capacity comprising:

means for minimizing the number of regenerators required using tie-breaking;

means for creating a list of lightpaths by optimally placing regenerators comprising:

means for locating a regenerator under optical reachability;

for a service path Ps requiring a predetermined number of regenerators, means for determining all possible regenerator placement combinations;

means for calculating $$\sum \frac{1}{A(i)}$$

over all lightpaths were A(i) is the number of available channels on lightpath i; and means for selecting the regenerator placement having minimal $$\sum \frac{1}{A(i)};$$

and means for assigning wavelengths to each lightpath; and means for minimizing a number of regenerators required;

means for implementing restoration requirements by selecting restoration paths and reserving standby lightpaths; and after service path Ps selection, restoration paths selection, and standby lightpath reservation, means for informing network nodes to perform provisioning and restoration via signaling.

8. The system according to claim 7 wherein means for assigning wavelengths to each lightpath further comprises:

means for sorting all available wavelengths; and means for selecting from the available wavelengths for each lightpath.

9. The system according to claim 7 wherein means for implementing restoration requirements further comprises:

means for creating all possible standby lightpath candidates using an express path without regenerators;

if at least a single fault restoration is desired, means for selecting a first restoration path P1 based on sharable standby lightpaths;

if at least a double fault restoration is desired, means for selecting a second restoration path P2 based on sharable standby lightpaths.

10. The system according to claim 9 wherein means for selecting a first restoration path P1 further comprises:
means for defining a failroute[k,j] as how many standby lightpath channels are required on standby lightpath j if link k fails where s[j]=max{k over E}failroute[k,j]−max{k over Ps}failroute[k,j] would be sharable channels on standby j for service path Ps;
means for setting standby lightpath j weight as max(0, n−s[j]);
means for using a shortest path method to select the smallest diverse extra standby lightpath channels as P1;
means for updating failroute[k,j]+=n for all k over Ps, and j over P1; and
means for reserving standby channels on j as max{k over E}failroute[k,j].

11. The system according to claim 9 wherein means for selecting a second restoration path P2 further comprises:
means for defining failrouteRA as how many standby lightpath channels are required on standby lightpath j if link k fails where s[j]=max{k over E}−max{k over Ps+P1}failroute[k, j] would be sharable channels on standby j for path Ps+P1, where Ps+P1 is defined as a double failure combination of one link from Ps and one link from P1;
means for setting standby lightpath j weight as max(0, n−s[j]);
means for using a shortest path method to select the smallest diverse extra standby lightpath channels as P2;
means for updating failroute[k,j]+=n for all k in Ps+P1, and j in P2, and updating failroute[k,j]+=n for all k in Ps−P1 and j in P1, where Ps−P1 is defined as a double failure combination of one link from Ps and one link not from P1; and
means for reserving standby channels on j as max{k over E}failroute[k,j].

12. The system according to claim 7 wherein means for informing network nodes to perform provisioning and restoration via signaling further comprises in the event of a service path Ps failure, means for performing restoration based on the preselected shared mesh restoration path.

* * * * *